US010759352B2

(12) United States Patent
Price

(10) Patent No.: US 10,759,352 B2
(45) Date of Patent: Sep. 1, 2020

(54) PORTABLE ORGANIZER

(71) Applicant: Michael Price, Concord, NC (US)

(72) Inventor: Michael Price, Concord, NC (US)

( * ) Notice: Subject to any disclaimer, the term of this patent is extended or adjusted under 35 U.S.C. 154(b) by 0 days.

(21) Appl. No.: 16/261,415

(22) Filed: Jan. 29, 2019

(65) Prior Publication Data

US 2019/0232882 A1 Aug. 1, 2019

Related U.S. Application Data

(60) Provisional application No. 62/623,347, filed on Jan. 29, 2018.

(51) Int. Cl.
| | |
|---|---|
| *B60R 11/00* | (2006.01) |
| *A45C 15/00* | (2006.01) |
| *A47B 43/00* | (2006.01) |
| *B60R 7/04* | (2006.01) |
| *H01R 13/46* | (2006.01) |

(52) U.S. Cl.
CPC ............. *B60R 11/00* (2013.01); *A45C 15/00* (2013.01); *A47B 43/00* (2013.01); *B60R 7/04* (2013.01); *H01R 13/46* (2013.01)

(58) Field of Classification Search
CPC ......... B60R 11/00; B60R 7/04; A45C 7/0045; A45C 7/005; A45C 7/0054; A45C 7/0086; A45C 7/009; A45C 7/0095; A45C 2200/15; A47B 47/0091; A47B 95/008; A47B 63/00; A47F 7/00
USPC ......... 224/582–585, 270, 524, 564; 312/245, 312/351, 211; 108/44
See application file for complete search history.

(56) References Cited

U.S. PATENT DOCUMENTS

| | | | | |
|---|---|---|---|---|
| 2,845,323 | A * | 7/1958 | Seibert, Jr. ............. | A47G 21/14 312/244 |
| 6,386,412 | B1 * | 5/2002 | Konechne ................ | B60R 7/04 224/275 |
| 6,704,952 | B2 * | 3/2004 | Kurtz ..................... | A47C 17/86 312/237 |
| 9,782,996 | B1 * | 10/2017 | Kuo ......................... | B42F 7/12 |
| 2002/0074199 | A1 * | 6/2002 | Albritton ................ | A45C 3/00 190/107 |
| 2005/0225108 | A1 * | 10/2005 | Panasewicz ............ | B60P 3/14 296/24.44 |
| 2010/0206765 | A1 * | 8/2010 | Fonte ...................... | A61J 7/04 206/534 |
| 2015/0196121 | A1 * | 7/2015 | Chan ....................... | A45F 5/12 312/107 |
| 2017/0055702 | A1 * | 3/2017 | Sklansky ............... | A47B 97/00 |

* cited by examiner

*Primary Examiner* — Scott T McNurlen

(57) ABSTRACT

A portable organizer used for storing personal items in vehicles to prevent belonging from being transported in a disorganized manner. Additionally, the organizer is designed to provide various storage options, as well as a charging platform. To achieve this the organizer has a back plate, a collection of receptacles, and a base plate. The receptacles are serially distributed across the base plate. Additionally, the receptacles are delineated by sidewalls and a shelf that is inclined relative to the back plate. This enables the stored items to remain within the receptacles when the vehicle is motion, and sudden maneuvers occur. Similarly, the base plate is positioned in between an edge of the back plate and the receptacles to provide another option for storing or dividing the personal items.

11 Claims, 8 Drawing Sheets

PORTABLE ORGANIZER

The current application claims a priority to the U.S. Provisional Patent application Ser. No. 62/623,347 filed on Jan. 29, 2018.

FIELD OF THE INVENTION

The present invention generally relates to storage items. More specifically, the present invention is a mobile file organizer, specifically designed to be integrated into vehicles.

BACKGROUND OF THE INVENTION

Personal storage containers are commonly used for a variety of purposes. Depending on their needs and lifestyles, various people often carry objects, such as cell phones, keys, wallets, and personal hygiene items, on a consistent basis. These items typically require storage, and the ability to keep personal items organized allows users to efficiently access their items. For people that spend a considerable amount of time in a vehicle, having storage space that is effectively utilized is crucial. For example, police officers are required to carry tactical gear at all times; however, the gear is only utilized during specific events and otherwise must remain properly stored for quick access when necessary. Additionally, some police officers have assigned patrol vehicles that they use daily, while other officers, depending on the policies of their departments, are required to frequently exchange cars. As such, it can become a cumbersome task for police officers to transfer their personal items from one vehicle to another. Furthermore, each vehicle has various underutilized spaces, which could be repurposed for storage depending on the make and model of the vehicle. Police patrol vehicles are typically equipped with a protective cage between the front and rear seats; however, an empty area between the front seats, where a center console is generally installed in civilian vehicles, remains largely unused. It is not uncommon for police officers to attempt to use that space to store miscellaneous items. However, since the compartment is not equipped with a device that will properly hold and organize items for an extended period of time, the objects typically shift, which creates frustrations and an unpleasant and unproductive working environment.

The present invention aims to facilitate the solution of the aforementioned issues by establishing a storage device specifically designed for vehicles. The storage device allows users to efficiently organize their personal belongings, while keeping their items secured. Limiting the unintentional movement of objects, especially during scenarios where the vehicle may be subjected to aggressive driving, is critical. Through the integration of a storage device specifically designed for vehicles, users would be able to organize objects of various sizes while ensuring their items remain properly secured.

DETAIL DESCRIPTIONS OF THE INVENTION

Figure 1:
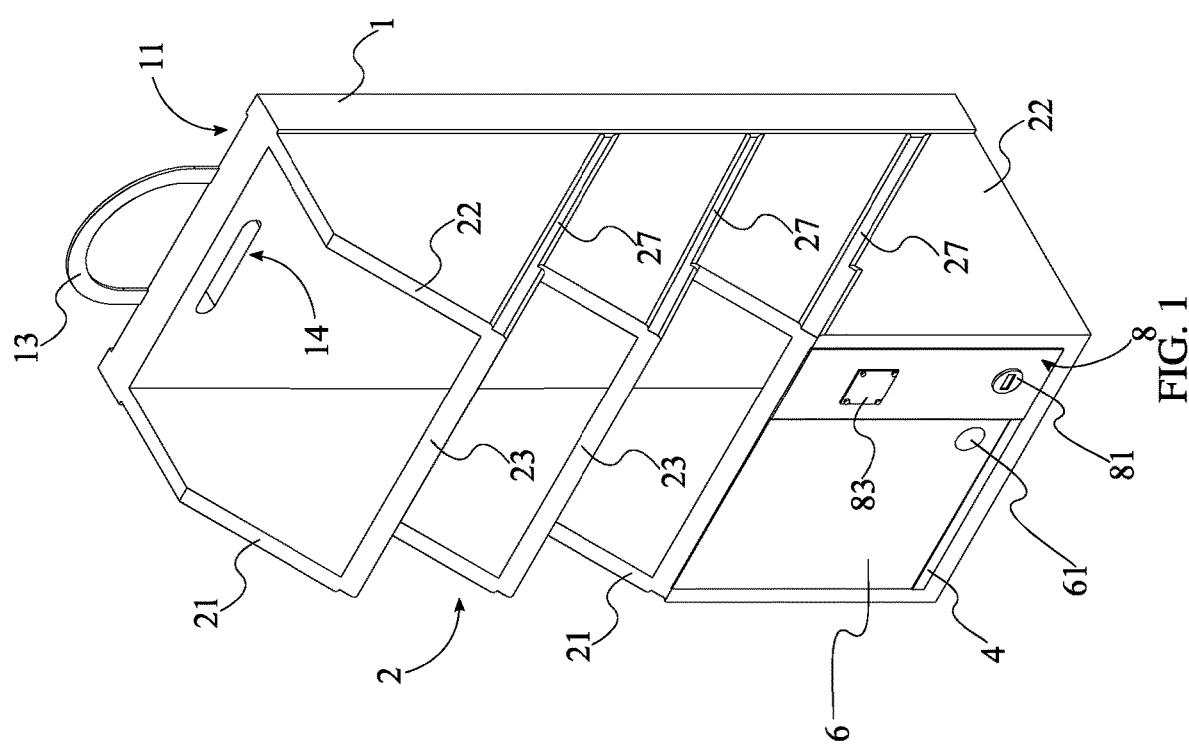
FIG. 1 is an isometric perspective view of the present invention.

All illustrations of the drawings are for the purpose of describing selected versions of the present invention and are not intended to limit the scope of the present invention.

The present invention, the portable organizer, is a device that is used for storing and securing personal items in vehicles. Preferably, the term personal item is used herein to refer to any object or belongings which a person may carry with them at any time. Fleet vehicle operators including but not limited to police officers, may be required to return their vehicles at the end of the work day. Therefore, even if a vehicle has numerous compartments for storage, the operator is not able to store their personal items inside permanently, since the same vehicle may be assigned to someone else the next day. The present invention is a portable organizer that is designed to provide the necessary space for a user to store personal items including but not limited to, files, mobile devices, work equipment, or tactical gear. Further, the present invention is designed to be transferred and secured from one vehicle to another with ease, while preventing the personal items from being displaced while the vehicle is in motion.

In reference to FIG. 1-4 to achieve the above-mentioned functionality the present invention comprises a back plate 1, a plurality of receptacles 2, and a base plate 3. The plurality of receptacles 2 function as the primary storage area for the present invention. The back plate 1 functions as a support surface allowing for the base plate 3 and the plurality of receptacles 2 to be attached. Each of the plurality of receptacles 2 comprises a first sidewall 21, a second sidewall 22 and an inclined shelf 23. The first sidewall 21, and the second sidewall 22 provide the lateral support needed for storage. The plurality of receptacles 2 is serially distributed along the back plate 1. Preferably, the plurality of receptacles 2 serve as a stacked storage area with numerous compartments. In reference to FIG. 4, the first sidewall 21 is connected adjacent to the back plate 1. The second sidewall 22 is positioned offset from the first sidewall 21 across the back plate 1. The inclined shelf 23 is connected between the first sidewall 21 and the second sidewall 22. As a result, the plurality of receptacles forms a plurality of compartments into which the personal items are placed.

Furthermore, the first sidewall 21, the second sidewall 22 and the back plate 1 delineate a containment receptacle where various personal items may be placed. Additionally, the inclined shelf 23 is angularly offset from the back plate 1 by an acute angle 233. Consequently, the personal items stored into the plurality of receptacles 2, are kept secured even when the present invention is installed in a vehicle, and the vehicle is in motion. The base plate 3 is connected adjacent to the back plate 1. The base plate 3 is positioned in between a first edge 11 of the back plate 1 and the plurality of receptacles 2. Accordingly, the base plate 3 provides an additional platform or divider for organizing the personal items. The inclined shelf 23, is oriented at the acute angle 233, preventing the objects stored within to be displaced accidentally while the vehicle is in motion. In the upright position, the inclined shelf 23 may be described as a negative slope.

Figure 4:
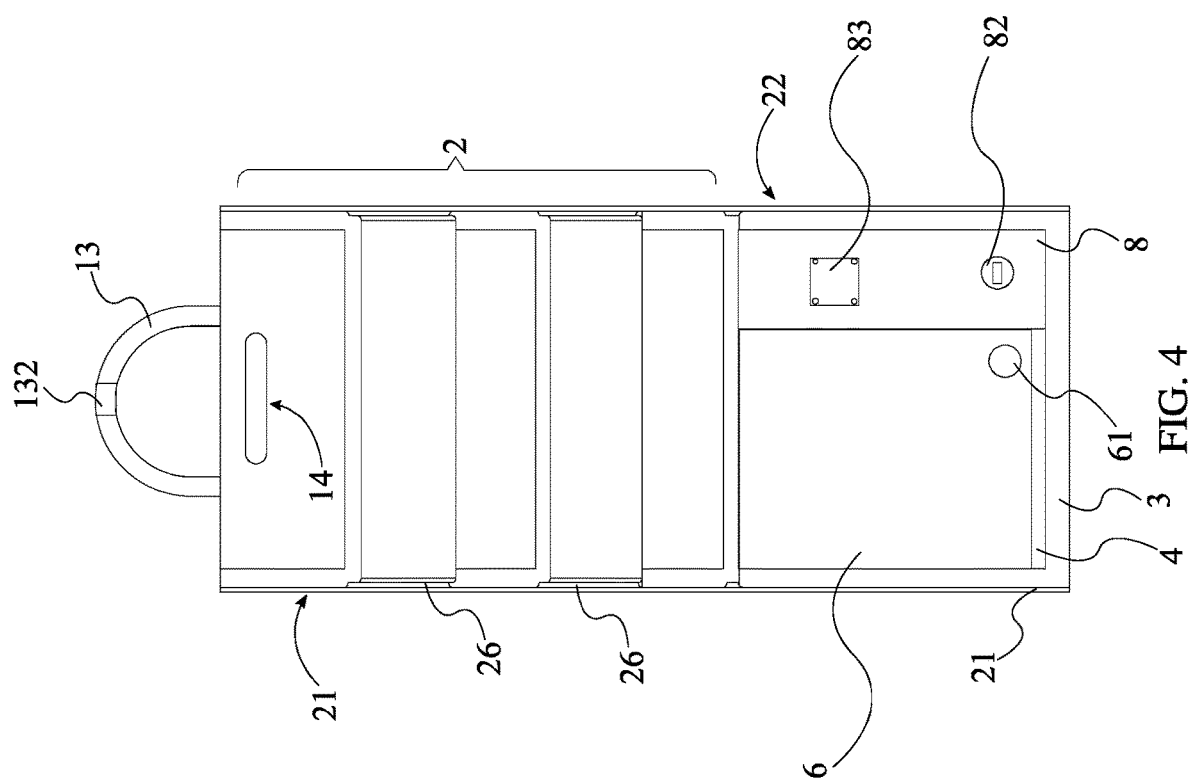
FIG. 4 is a front view of the present invention.
Figure 5:
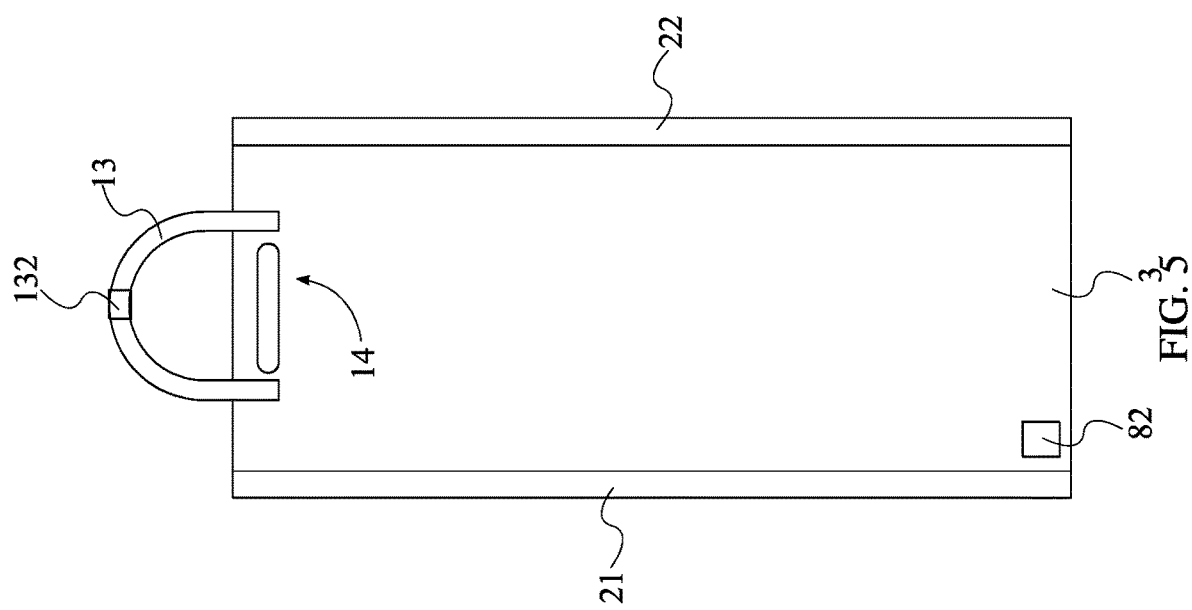
FIG. 5 is a back-side view of the present invention.

In reference to FIGS. 4-5, each of the plurality of receptacles 2 further comprises an adjacent receptacle 24 and an arbitrary receptacle 25. The adjacent receptacle 24 and the arbitrary receptacle 25 are identical in design and function. The adjacent receptacle 24 is positioned adjacent to the arbitrary receptacle 25. The arbitrary receptacle 25 is positioned in between the adjacent receptacle 24 and the base plate 3. Thus positioned, the arbitrary receptacle 25 and the adjacent receptacle 24 in combination with the inclined shelf 23 provide a sloped recessed compartment, where personal items may be stored.

Figure 6:
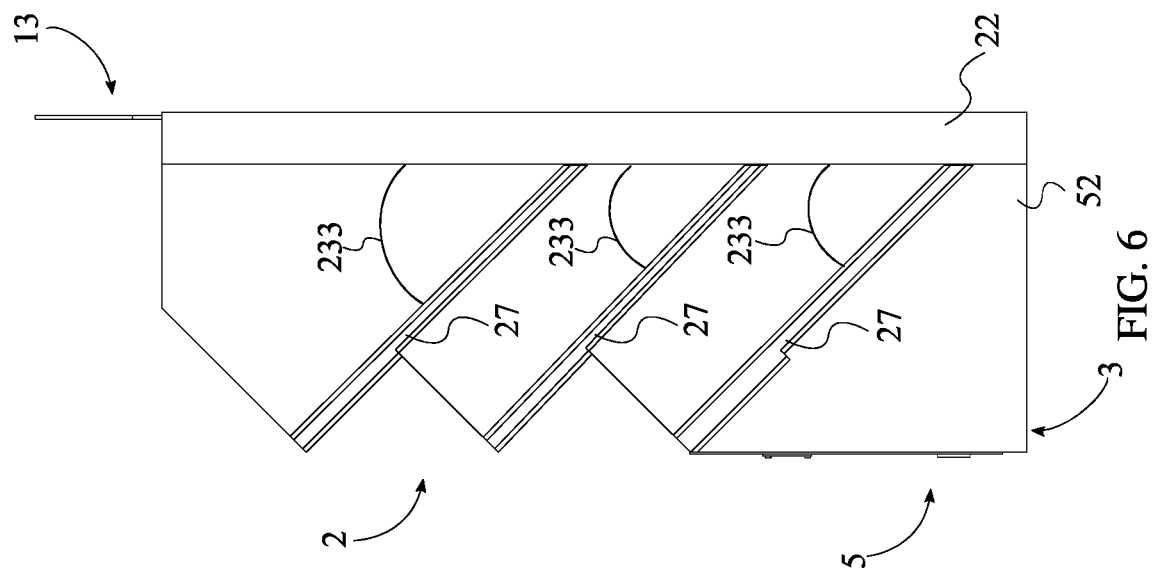
FIG. 6 is a right view of the present invention.
Figure 7:
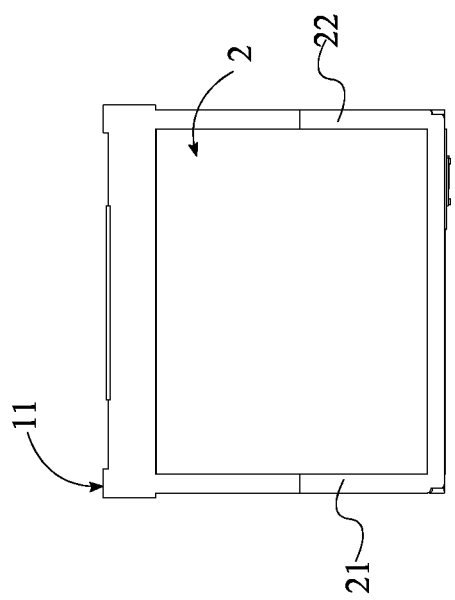
FIG. 7 is a top view of the present invention.
Figure 8:
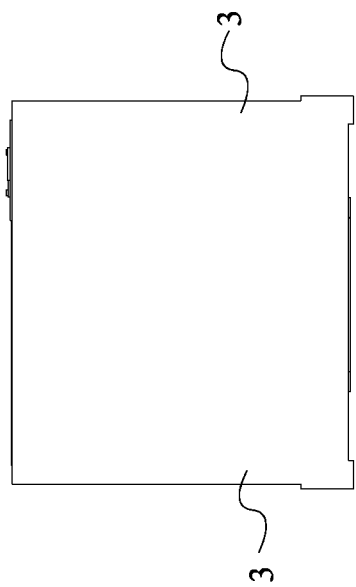
FIG. 8 is a bottom view of the present invention.

In reference to FIG. 4-6, each of the plurality of receptacles 2 further comprises a first guide channel 26 and a second guide channel 27. The first sidewall 21 of the arbitrary receptacle 25 interlocks with the first guide channel 26 of the adjacent receptacle 24. Similarly, the second sidewall 22 of the arbitrary receptacle 25 interlock with the second guide channel 27 of the adjacent receptacle 24. Accordingly, the first guide channel 26, the first sidewall 21, the second guide channel 27 and the second sidewall 22 reinforce the rigidity of the present invention. In the preferred embodiment, the arbitrary receptacle 25 is permanently fastened to the adjacent receptacle 24. Likewise, the back plate 1 is terminally connected to the base plate 3. Furthermore, in the preferred embodiment the back plate 1 and the base plate 3 are connected in an L-shaped arrangement. The first shelf edge 231 is positioned opposite to the second shelf edge 232, across the inclined shelf 23. The first guide channel 26 is positioned along the first shelf edge 231. The second guide channel 27 is positioned along the second shelf edge 232. The first sidewall 21 of the arbitrary receptacle 25 engages into the first guide channel 26 of the adjacent receptacle 24. The second sidewall 22 of the arbitrary receptacle 25 engaging into the second guide channel 27 of the adjacent receptacle 24. As a result, the first guide channel 26, and the second guide channel 27 of an arbitrary receptacle 25, allow the first sidewall 21 and the second sidewall 22 to be positioned level in the same plane with the respective first sidewall 21 and second sidewall 22 maintaining an overall compact design. In the preferred embodiment, the plurality of receptacles 2 are interlocked permanently to the first guide channel 26, and the second guide channel 27. However, in an alternative embodiment the arbitrary receptacle 25 may be separated from the adjacent receptacle 24 creating a modular design. In reference to FIGS. 7-8, the portable file organizer comprises a lip 4. The lip 4 prevents personal items placed within the present invention from sliding out during sudden movements of the vehicle. The lip 4 is connected adjacent to the base plate 3, opposite to the back plate 1. As a result, the lip 4 extends across the front width of the base plate 3. During sudden braking and accelerating, the generated momentum forces may unsettle unsecured items in vehicles.

Figure 3:
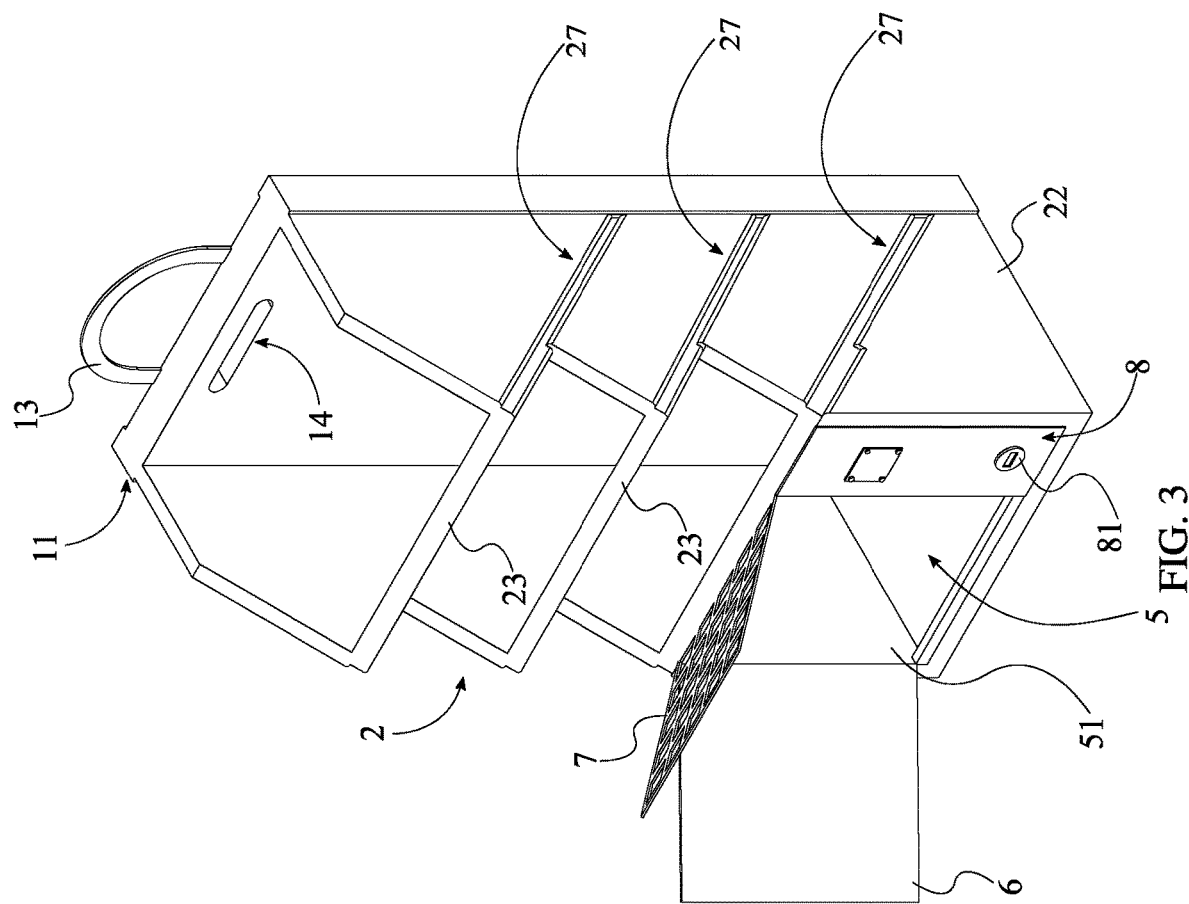
FIG. 3 is an isometric perspective view of the present invention, with the door open.

In reference to FIG. 3, the present invention further comprises a base receptacle 5. The base receptacle 5 is mounted onto the base plate 3. The base receptacle 5 is positioned in between the base plate 3 and the plurality of receptacles 2. The base receptacle 5 creates an enclosed space where personal items may be stored. Claim 6: Furthermore, the base receptacle 3 comprises a first base wall 51 and a second base wall 52. The first base wall 52 is connected adjacent to the back plate 1. The second base wall 52 being connected adjacent to the back plate 1. The second base wall 52 being positioned offset from the first base wall 51, across the back plate 1. The base plate 3 is connected in between the first base wall 51 and the second base wall 52. Accordingly, the base receptacle 5 forms a compartment into which personal items are kept. For example, mobile devices, files, and personal items may be stored within the base receptacle 5, to enable the present invention to function as a standalone storage unit.

Figure 2:
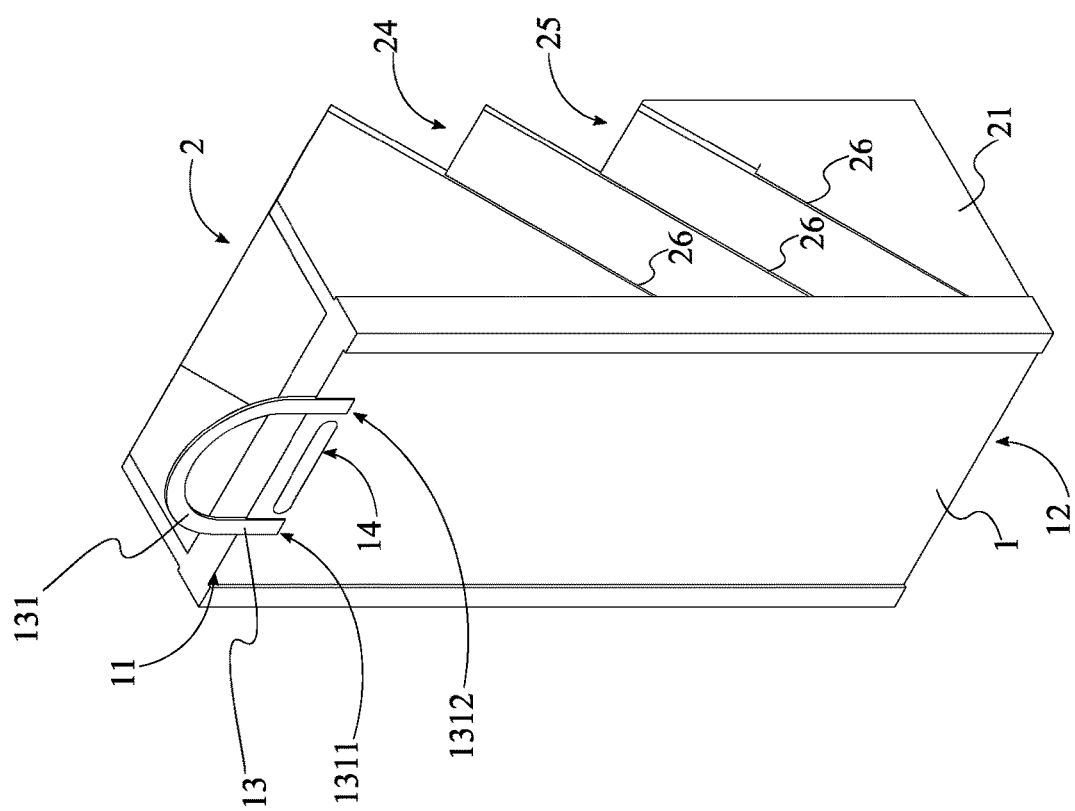
FIG. 2 is a back-isometric perspective view of the present invention.

In reference to FIG. 1-3 as described above the present invention is designed to facilitate the storage and securing of personal items. To facilitate this, the present invention comprises a door 6. The door 6 is mounted over an opening of the base receptacle 5. The door 6 functions as a barrier between the base receptacle 5, preventing unwanted access into the base receptacle 5. In the preferred embodiment, the door 6 is pivotally attached to the base receptacle 5. However, various other attachments mechanisms may be used including, but not limited to, hinges and sliding rails. Furthermore, to secure the door 6, the present invention comprises a locking mechanism 61. The locking mechanism 61 is integrated in between the door 6 and an opening of the base receptacle 5. Various types of locking mechanism 61 may be integrated including, but not limited to, mechanical locks or electrical locks depending on user preference of application. The door 6 is mounted over an opening of the base receptacle 5. As a result, the door 6 covers the opening, preventing or permitting access to the interior of the base receptacle 5. Furthermore, by integrating the locking mechanism 61 into the present invention, the space encapsulated by the base receptacle 5 is secured.

In reference to FIG. 3, the present invention comprises a net 7. The net 7 is connected between the first base wall 51, and the second base wall 52. The net 7 is mounted over the opening of the base receptacle 5 behind the door 6. Consequently, the net 7 provides and additional layer of security between the opening of the base receptacle 5, and the base receptacle 5 enclosure. In the preferred embodiment the net 7 is flexible, and the user is able to simply reposition the net 7 according to preference. Furthermore, the present invention further comprises a housing 8, at least one electrical inlet 81, at least one electrical outlet 82, and a mounting platform 83. The electrical inlet 81 and the electrical outlet 82 are electrical connectors that enable the present invention to be electronically coupled to external systems. In some embodiments of the present invention, the housing 8 may be further used as a mounting platform 83 for a variety of other accessories. The housing 8 is mounted within the base receptacle 5. As a result, the electrical inlet 81 and electrical outlet 82 are encapsulated within the housing 8. The electrical inlet 81 is laterally mounted onto the housing 8. Similarly, the electrical outlet 82 is laterally mounted onto the housing 8. Further, the electrical inlet 81 is electrically connected to the electrical outlet 82. As a result, the present invention can be used to deliver power from an external electrical source to one or more connected peripheral devices. The mounting platform 83 is laterally mounted onto the housing 8. The electrical outlet 82 allows the user to charge personal electronic devices. In the preferred embodiment, the electrical outlet 82 is a Universal Serial Bus (USB) outlet. In addition, the electrical outlet 82 maybe of various connections including but not limited to cigarette lighter plugs traditionally used in automobiles. In the preferred embodiment, the electrical inlet 81 is connected to the corresponding outlet in the vehicle.

In reference to FIGS. 1-8, the present invention further comprises a handle 13 and a second edge 12. The second 12 edge is positioned opposite to the first edge 11 across the back plate 1. The handle 13 is connected adjacent to a second edge 12 of the back plate 1. Consequently, the handle 13 provides a lifting point for the user, to carry the present invention in the upright position, without the risk of damaging the personal items, or disorganizing the items. Furthermore, the handle 13 comprises a strap 131 and a buckle. The buckle 132 is integrated into the strap 131. The buckle 132 is positioned in between the first end 1311 and the second end 1322. The buckle 132 is adjustable and allows the user to set the strap 131 at the desired length depending on personal preference. As a result, the length of the handle 13 may be further adjusted. The present invention comprises a slot 14. The slot 14 transverses the back plate 1. The slot 14 is positioned adjacent to the second edge 12 of the back plate 1. The slot 14 allows a user to slide their hand through the back plate 1 and transport the present invention in their preferred positions. Furthermore, a lanyard may be positioned through the slot 14 allowing the user to secure the invention through a variety of other objects.

Although the invention has been explained in relation to its preferred embodiment, it is to be understood that many other possible modifications and variations can be made without departing from the spirit and scope of the invention as hereinafter claimed.

What is claimed is:
1. A portable organizer comprising:
a back plate;
a plurality of receptacles;
a base plate;
each of the plurality of receptacles comprising a first sidewall, a second sidewall, and an inclined shelf;
the plurality of receptacles being serially distributed along the back plate;
the first sidewall being connected adjacent to the back plate;
the second sidewall being connected adjacent to the back plate;
the second sidewall being positioned offset from the first sidewall, across the back plate;
the inclined shelf being connected in between the first sidewall and the second sidewall;
the inclined shelf being angularly offset from the back plate by an acute angle;
the base plate being connected adjacent to the back plate;
the base plate being positioned in between a first edge of the back plate and the plurality of receptacles;
a base receptacle;
the base receptacle being mounted onto the base plate;
the base receptacle being positioned in between the base plate and the plurality of receptacles;
a housing;
at least one electrical inlet;
at least one electrical outlet;
a mounting platform;
the housing being mounted within the base receptacle;
the electrical inlet being laterally mounted onto the housing;
the electrical outlet being laterally mounted onto the housing;
the electrical inlet being electrically connected to the electrical outlet; and
the mounting platform being laterally mounted onto the housing.

2. A portable organizer as claimed in claim 1 comprising:
each of the plurality of receptacles further comprising an adjacent receptacle and an arbitrary receptacle;
the adjacent receptacle being positioned adjacent to the arbitrary receptacle;
the arbitrary receptacle being positioned in between the adjacent receptacle and the base plate.

3. A portable organizer as claimed in claim 2 comprising:
each of the plurality of receptacles further comprising a first guide channel and a second guide channel;
a first shelf edge being positioned opposite to a second shelf edge, across the inclined shelf;
the first guide channel being positioned along the first shelf edge;
the second guide channel being positioned along the second shelf edge;
the first sidewall of the arbitrary receptacle engaging into the first guide channel of the adjacent receptacle;
the second sidewall of the arbitrary receptacle engaging into the second guide channel of the adjacent receptacle.

4. A portable organizer as claimed in claim 1 comprising:
a lip;
the lip being connected adjacent to the base plate, opposite to the back plate.

5. A portable organizer as claimed in claim 1 comprising:
the base receptacle comprising a first base wall and a second base wall;
the first base wall being connected adjacent to the back plate;
the second base wall being connected adjacent to the back plate;
the second base wall being positioned offset from the first base wall, across the back plate;
the base plate being connected in between the first base wall and the second base wall.

6. A portable organizer as claimed in claim 1 comprising:
a door;
the door being mounted over an opening of the base receptacle.

7. A portable organizer as claimed in claim 1 comprising:
a door;
a locking mechanism;
the locking mechanism being integrated in between the door and an opening of the base receptacle;
the door being mounted over an opening of the base receptacle.

8. A portable organizer as claimed in claim 1 comprising:
a net;
the net being connected between a first base wall and a second base wall;
the net being mounted over an opening of the base receptacle behind a door.

9. A portable organizer as claimed in claim 1 comprising:
a handle;
a second edge of the back plate;
the second edge of the back plate being positioned opposite to the first edge across the back plate;
the handle being connected adjacent to the second edge of the back plate.

10. A portable organizer as claimed in claim 1 comprising:
a handle;
the handle comprising a strap and a buckle;
the back plate being connected in between a first end of the strap and a second end of the strap;
a second edge of the back plate;
the second edge of the back plate being positioned opposite to the first edge across the back plate;
the handle being connected adjacent to the second edge of the back plate;
the buckle being integrated into the strap;
the buckle being positioned in between the first end and the second end.

11. A portable organizer as claimed in claim 1 comprising:
a slot;
the slot traversing through the back plate;
the slot being positioned adjacent to a second edge of the back plate.

* * * * *